Figure 1A:
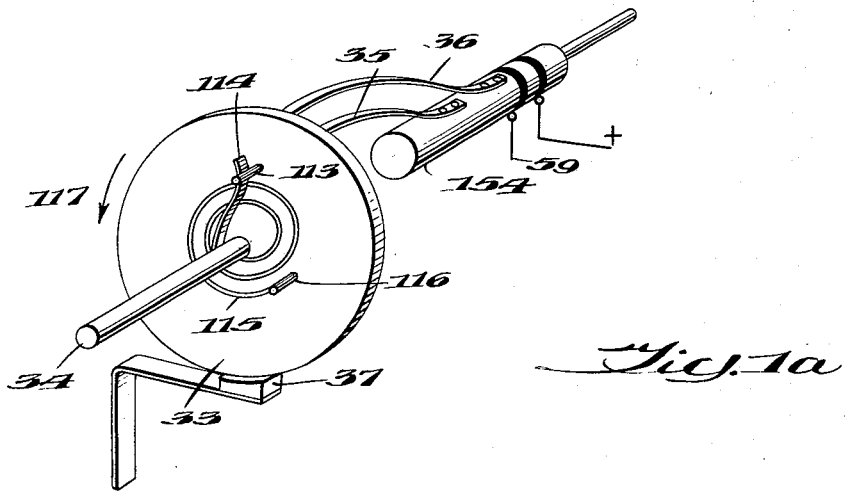

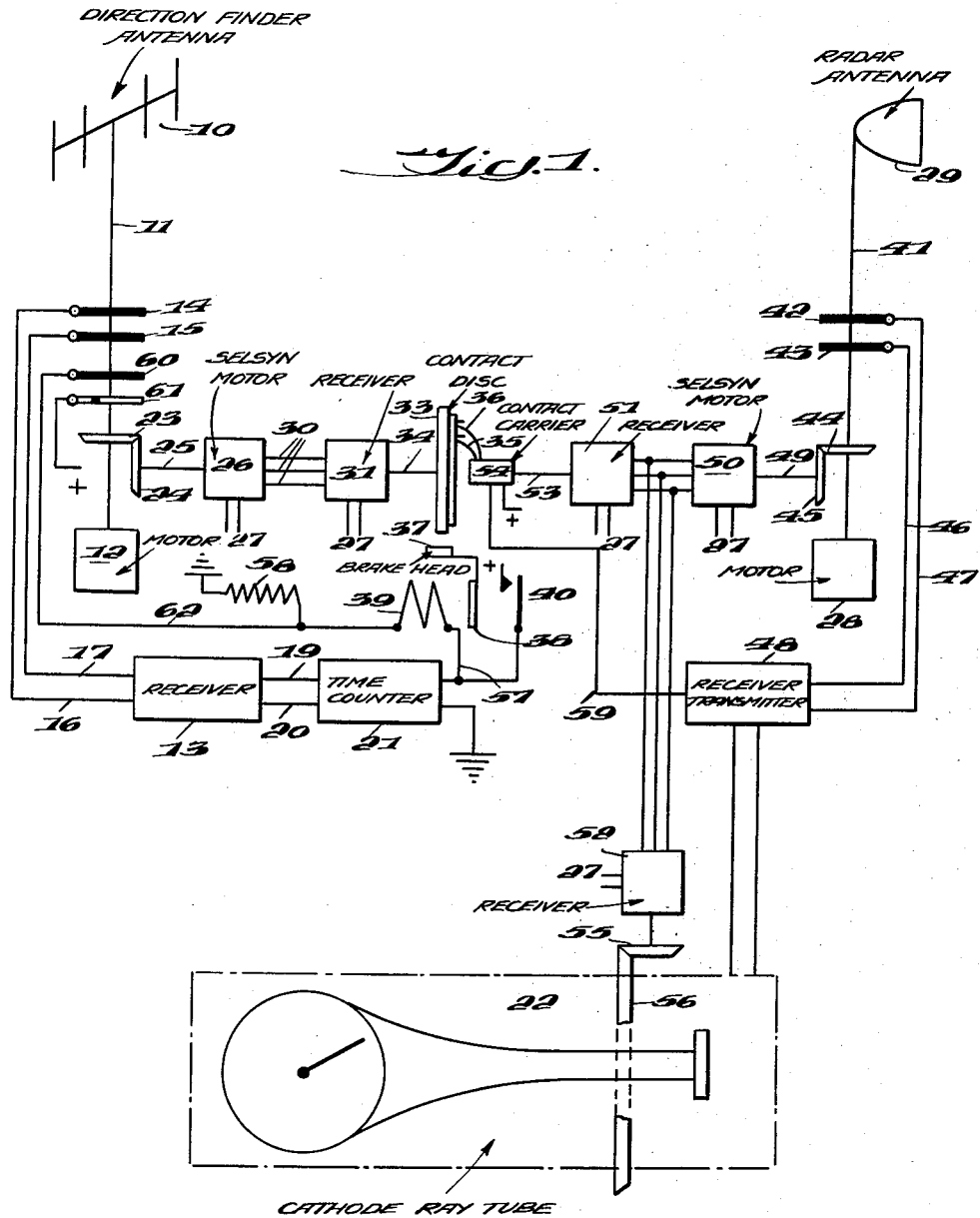

INVENTOR
CARL-ERIK GRANQVIST,

BY Larson and Taylor
ATTORNEYS

United States Patent Office 2,927,316
Patented Mar. 1, 1960

2,927,316
ARRANGEMENT IN CONSTRUCTIONS FOR AUTOMATIC RADIO DIRECTION FINDING

Carl-Erik Granqvist, Lidingo, Sweden, assignor to Svenska Aktiebolaget Gasaccumulator, Lidingo, Sweden, a corporation of Sweden Application September 22, 1953, Serial No. 381,596

Claims priority, application Sweden October 27, 1952

4 Claims. (Cl. 343—6)

It has been proposed for automatic radio direction finding to use an arrangement, combined with a radar arrangement for scanning the same field in the air, within which the direction finding takes place. It has thereby been proposed to arrange a first antenna construction for direction finding and a second antenna construction for radar. These two antenna constructions have thereby been arranged to rotate synchronously with each other and in given angular relation to each other, the signals from each antenna construction being arranged to be brought, after amplifying, to a common indicator means, preferably a cathode ray tube. The indications of the direction finding signal are represented in one way, for instance by a radial line or the like, whereas the indications of the radar signal are represented by dots, figures or the like, indicating the position in the scanned field of the objects, reflecting the radar beam.

The most obvious way to produce the above mentioned synchronism between the movements of the antennae would be to arrange them rotatable on a common shaft. It might, however, under certain circumstances be impossible to make such an arrangement, for instance, when the required space is not at hand or when the means arranged to support the existing antenna are not placed in such a way that the second antenna may be mounted on the same shaft. Thereto is added the fact that the different character of the two signals, intended to be received by the respective antennae, might make it desirable that they should work at different rotating speeds.

As long as the antennae may be rotated at the same speed, they might be connected in some suitable way. Thus, a purely mechanical coupling might be used, provided that space and other qualifications are at hand for arranging gear wheels and so on, but it is also possible to use an electrical synchronous coupling. Reliable synchronous couplings for such purposes must, however, have rather high power if one wishes to be sure that not only the synchronism but also the right mutual angle position are maintained. All such synchronous couplings require a rather great number of conductors and some of the existing sources of errors increase in direct proportion to the number of conductors and the length of these conductors.

There is therefore a demand for a simple and reliable arrangement, making it possible to apply the principle of reproducing a direction finding indication and a radar indication simultaneously on the same indicator, preferably the same cathode ray tube, and yet allowing the two antenna systems to rotate rather independent of each other, for instance without exactly the same speed or exactly the same mutual angle position having to be maintained.

This task is solved according to the present invention in that the indication of information received by one signal to be delivered to the indicator is figuratively accumulated or stored in order to be released on a given later occasion, said occasion occurring at a time fixed by the antenna position of the second signal.

Figure 1B:
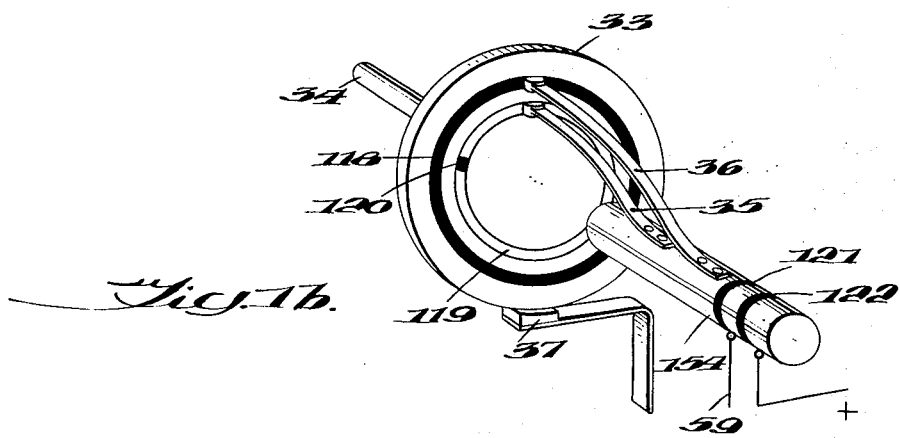

The invention is further illustrated below in connection with one embodiment which will be described in connection with the attached drawings, in which Fig. 1 shows a form of execution of the invention, and Figs. 1a and 1b show details of construction of Fig. 1.

In Fig. 1 there is shown an antenna 10, intended for direction finding. It is adapted to be rotated and is mounted on a shaft 11, driven by a motor 12. Two contact rings 14, 15 are arranged for transferring the received direction finding signal to a receiver 13, said rings being connected by means of brushes to the receiver 13 over the conductors 16, 17. The output side of the receiver 13 is connected to a time counter over the conductors 19, 20. The details of construction of the time counter are shown and described in my copending application, Serial No. 306,597, filed August 27, 1952, for "Arrangements in Automatic Radio Direction Finding Systems," now U.S. Patent No. 2,730,716, issued Jan. 10, 1956. The time counter, indicated by 21, functions briefly in the following way:

The antenna 10 is assumed to be of the kind which has a sharply limited direction characteristic, usually in the form of a pointed picture like a cigar. When the antenna rotates, a signal is therefore received for a very short time during each turn, that is only when the direction characteristic is turned towards the transmitter, the bearing of which is to be found. During this short time per turn of the rotation of the antenna the signal is transferred by the receiver 13 to the time counter 21 which is immediately started. The time counter determines the time until half of the pulse from the antenna 10 has passed, thereby transmitting a marking pulse, which, in a way to be described hereinafter, is transferred to the cathode ray tube 22, this tube being of a conventional kind and therefore not requiring further description here. A moment of time is always measured as the distance in time from a given reference moment, and the reference moment may be chosen as the moment when the antenna system is in a given direction, for example, north. For this purpose the time measuring means of the time counter 21 is put into motion with a given speed, when the antenna system 10 passes the position corresponding to the reference direction. When the direction finding pulse is received, the speed is reduced by one half, whereby the time counter, at half of the pulse time, has reached a registered time, corresponding to the release front of the input pulse signal from the antenna 10. When the signal ceases, the time counter therefore does not mark the whole time from the reference moment to the moment of the ceasing of the pulse, but it marks the time from the reference moment to the moment at which half the pulse has passed. When, later on, the time, thus registered in the time counter, is transformed into a marking, for instance in the form of a radial line on the screen of the cathode ray tube, which differs from the reference direction with an angle, corresponding to the rotational angle of the antenna system 10 during the registered period of time, this line will point straight to the found object and consequently also indicate the bearing of this object.

There is on the shaft 11 a bevel gearing, consisting of the cog-wheels 23, 24, driving the axle 25 of a Selsyn motor or other similar synchronous element 26. This Selsyn motor is, as well as the other synchronous elements present in the construction, fed with alternating current from alternating current mains, and the feed lines have therefore not been indicated in the drawing. The same mains are also suitably used for driving the motor 12 as well as a further motor 28, making the radar antenna 29 rotate.

The transmitter 26 of the Selsyn system by way of line 30 causes a receiver 31 to rotate in exact conformity to the movement of the transmitter. This receiver 31 by means of the axle 34 drives a contact disc 33.

The contact disc 33 as seen in Fig. 1a is freely mounted on the shaft 34 and carries a pin 113 which is normally in contact with a finger 114 on the shaft 34. A spring 115 is mounted with one end fastened to the shaft 34 and its other end fastened to a pin 116 on the disc 33 in the direction of the arrow 117 so that the pin 113 will be in contact with the end of the finger 114.

The opposite side of contact disc 33 is shown in Fig. 1b wherein two contact rings 118 and 119 are rigidly secured to the face of the disc. The contact ring 118 is metallic around its entire periphery whereas the other contact ring 119 has only a small metallic fragment 120. The ring 119 is otherwise constructed of insulating material. The two rings 118 and 119 are contacted by contact springs 35 and 36, respectively, which are carried by the contact carrier 154 provided with slip rings 121 and 122, respectively. These two slip rings cooperate with brushes connected to the conductor 59 and to a conductor connected to the positive terminal.

In order to brake the rotation of the disc 33, a brake head 37 is arranged to be operated by means of the armature 38 of a magnet 39, which is also made in the form of a relay, so that it will upon being magnetized close a contact 40. The relay magnet 39 is connected to the output circuit of the time counter 21 by conductor 57.

The radar antenna 29 is driven by the motor 28 by means of the axle 41, supporting two contact rings 42, 43 and also one of the cog-wheels in a bevel gearing 44, 45. The contact rings are connected to the receiver and the transmitter 48 for the radar signal by means of conductors 46 and 47 and the slip contacts. The arrangement is such that the radar equipment 48 transmits a repeated succession of very short pulses through the antenna 29, said pulse waves being reflected and again received by the same antenna, transferred to the radar apparatus and there transformed into pulses for recording on the cathode ray tube 22. In other respects the radar arrangement may be of usual construction.

The shaft 49 of a Selsyn transmitter 50 is driven by means of the bevel gearing 44—45, and the transmitter drives its receiver 51 as well as a further receiver 52, the function of which will be described hereinafter. The receiver 51 drives contact carrier 54 by shaft 53, which contact carrier supports the two contact springs 35 and 36, mentioned above.

The receiver 52 drives the cathode ray tube around in complete conformity to the rotation of the antenna 29 by means of the shaft connected to bevel gear 55 and bevel gear 56. This arrangement has been shown here in order to illustrate how the sweeping of the scanned space in the air takes place, but it is evident that the field rotation in the cathode ray tube may be brought about in any way and the driving by mechanical rotation of the cathode ray valve must therefore be considered only as an illustration of any arbitrary driving means or means for bringing about a field rotation in synchronism with the rotation of the antenna 29.

The arrangement functions in the following way:

It is assumed that the antenna 10 is rotating somewhat faster than the antenna 29. When the antenna 10 passes its reference position, for instance the north direction the time counter 21 is started in some way, forming no part of the present invention. When thereafter a signal is received by means of the antenna 10, this signal is transmitted to the time counter, there causing the counter to start working with half of the speed. When the pulse ceases, the counter 21 is brought to transmit a pulse to ground over the conductor 57, winding 39 and resistor 58. Thus the magnet 39 is magnetized, its armature is attracted, and the brake 37 will prevent the disc 33 from further rotation. At the same time as the magnet 39 was magnetized, it also attracted its contact supporting armature, and consequently a contact 40 was closed, through which the circuit for the magnet is maintained, independently of the pulse from the counter.

In this way the disc 33 has been kept in rotation until the instant, when the center of the input signal from the direction finding antenna past at which time the brake was suddenly applied to the disc. The disc is then kept in this position with the brake applied, and the rotation angle of the disc therefore indicates the angle distance from the reference direction to the direction found.

Meanwhile the radar antenna has, however, also been rotating, but preferably with a somewhat lower speed. Shortly after the disc having been brought to standstill, the contact set 35, 36, driven synchronously with the rotation of the radar antenna by means of the Selsyn transmission 50—51, will therefore reach the place on the contact paths of the disc 35, where contact is closed. The synchronous transmission is such that the cathode ray tube 22 has been turned to a position, indicating the bearing of the object, the direction of which has been found, at the moment when contact is closed between the brushes 35 and 36. A positive pulse is thereby momentarily transmitted over the conductor 59 to the radar receiver and by this receiver transmitted to the cathode ray tube 22 in such a way that the cathode ray of this tube momentarily moves across the whole radius of the tube. The ray thereby draws a radial line on the screen, indicating the bearing to the transmitter, the direction of which has been found.

It is of course of no importance for the invention if the indication takes place by drawing of a radial line on the screen or in some other way. For certain purposes it may be especially suitable to draw not one single line but instead two lines, forming a very narrow angle with respect to each other, within which angle the radar picture of the object found is situated.

When somewhat later the direction finding antenna 10 is in the reference position (the north direction, for example), a contact is momentarily closed across two further contact rings 60, 61 on the shaft of this antenna, and a pulse is transmitted over the conductor 62 to the magnet winding 39. This pulse is positive and consequently the magnet winding 39 is bypassed and the magnet is demagnetized. The contact 40 is thereby opened and as subsequent of this pulse, there is no pulse over the conductor 57 from the time counter 21, the arrangement is now ready for operation.

Obviously many modifications and variations of the present invention are possible in light of the above teachings. What is claimed as new and desired to be secured by Letters Patent is:

1. In a system for correlating intelligence from independently operating radar and radio direction finding equipment and for recording the same on a single cathode ray tube wherein said equipments include independently rotating antennas, in combination, means for storing an indication of a bearing angle determined by the direction finding antenna, said means including a contact ring synchronously operated with the direction finding antenna and means for stopping said contact ring at the bearing angle, and means responsive to the angular position of the radar antenna operatively associated with said contact ring for transmitting a pulse to the cathode ray tube when said radar antenna reaches the bearing angle.

2. An arrangement according to claim 1 including means for producing a zero positioning pulse for said first-named means when the direction finding antenna reaches a reference position.

3. An arrangement according to claim 1 wherein said last-named means includes a contact set operatively associated with said contact ring and synchronously operated with the radar antenna and means for transmitting a pulse to the cathode ray tube when said contact set reaches the stop position of said contact ring.

4. In a system for correlating intelligence from independently operating radar and radio direction finding equipment and for recording the same on a single cathode ray tube wherein said equipments include independently rotating antennas, in combination, a time counter for receiving input pulses from the direction finding antenna, a contact ring synchronously operated with the direction finding antenna, means responsive to an output pulse from said time counter to brake said contact ring, a contact set synchronously operated with the radar antenna and means for transmitting a pulse to the cathode ray tube when the contact set reaches the braked position of said contact ring.

References Cited in the file of this patent

UNITED STATES PATENTS

| | | |
|---|---|---|
| 2,426,245 | Skellett | Aug. 26, 1947 |
| 2,520,595 | Fernsler | Aug. 29, 1950 |
| 2,551,589 | Everhart | May 8, 1951 |
| 2,597,895 | Novy | May 27, 1952 |
| 2,654,085 | Goldstein | Sept. 29, 1953 |
| 2,666,198 | Wallace | Jan. 12, 1954 |
| 2,683,874 | Wainright | July 13, 1954 |
| 2,745,096 | Jensen | May 8, 1956 |